W. Sternberg,
Cheese Hoop.
No. 113,809.  Patented Apr. 18, 1871.
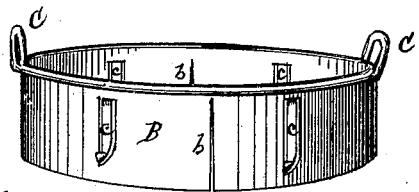
Fig. 1.
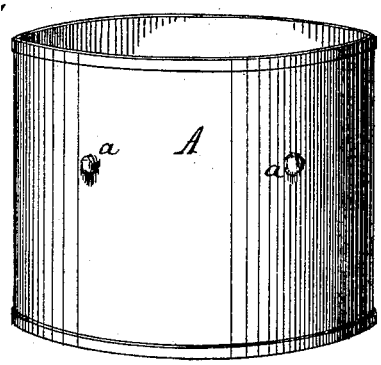
Fig. 2.
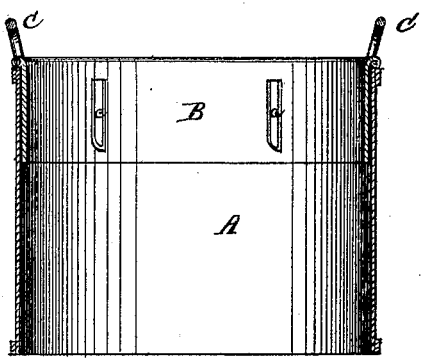
Witnesses.
E. U. Scoville
W. L. Scoville
Inventor.
Wm Sternberg
per J. A. Morley
Atty.

United States Patent Office.

WILLIAM STERNBERG, OF BRIDGEPORT, NEW YORK.

Letters Patent No. 113,809, dated April 18, 1871.

IMPROVEMENT IN CHEESE-HOOPS.

The Schedule referred to in these Letters Patent and making part of the same.

*To all whom it may concern:*

Be it known that I, WILLIAM STERNBERG, of Bridgeport, in the county of Madison and State of New York, have invented a new and useful Improvement in Cheese-Hoops; and I do hereby declare that the following is a full, clear, and exact description thereof, which will enable others to make and use the same, reference being had to the accompanying drawing forming part of this specification, in which—

Figure 1 is a perspective view, the cheese-hoop and bandage-holder separated.

Figure 2 shows a sectional view of the same when together.

Similar letters of reference indicate like parts.

In the accompanying drawing—

A is the cheese-hoop, and

B is the bandage-holder.

The bandage-holder is a rim of sheet metal, made to fit snug into the upper part of the hoop. The lower edge of this rim is slitted, as shown at $b\ b$, so as to enter the hoop freely and have a degree of elasticity; and the upper edge has a slight flange or stop that comes in contact with the upper edge of the hoop when the rim B is down, and is provided with handles C C.

The said rim has also a number of vertical slots, which are occupied by springs $c$, that terminate with a small hook or shoulder at their lower ends, the hooks facing outward to engage with the bandage and hold its upper edge secure on the rim.

The bandage is placed in the hoop as follows: its upper edge is drawn on over the rim, and the rim is then pressed down within the hoop, and the bandage is securely clamped in between them, the hooks $c$ giving the rim a better hold of the bandage, so that it cannot be drawn out by the downward strain caused by the movement of the follower and curd, and by these means the bandages are applied without having to remove the cheese from the hoop and replace it after applying the bandage, thereby making a material saving in labor.

The hoop A has holes or indentations $a\ a$ for accommodating the hooks $c\ c$, so that they will not cause the springs to project beyond the inner surface of the rim and interfere with the follower.

The lower ends of the spring hooks $c\ c$ are made with an oblique edge upon one side, so that they will be disengaged from the indentations $a\ a$ of the hoop by a twisting motion of the rim in said hoop.

Having thus described my invention,

What I claim, and desire to secure by Letters Patent, is—

In connection with the hoop A, the rim B having slits $b$, and spring hooks $c\ c$, substantially as and for the purpose described.

The above specification of my invention signed by me this 2d day of March, 1871.

WILLIAM STERNBERG.

Witnesses:
E. H. SCOVILLE,
F. A. MORLEY.